United States Patent [19]

Daghe

[11] 4,141,537

[45] Feb. 27, 1979

[54] VALVE SEAT CONSTRUCTION FOR BUTTERFLY VALVES

[75] Inventor: Joseph L. Daghe, Decatur, Ill.

[73] Assignee: Mueller Co., Decatur, Ill.

[21] Appl. No.: 645,455

[22] Filed: Dec. 30, 1975

[51] Int. Cl.² ............................................ F16K 1/226
[52] U.S. Cl. ..................................... 251/306; 251/365;
                                                                  251/173
[58] Field of Search ............... 251/365, 171, 173, 305,
                                                                  251/306, 307

[56] References Cited

U.S. PATENT DOCUMENTS

| | | | |
|---|---|---|---|
| 2,965,354 | 12/1960 | Grove et al. | 251/306 |
| 3,409,269 | 11/1968 | Fawkes | 251/306 |
| 3,511,474 | 5/1970 | Miner | 251/305 |
| 3,550,905 | 12/1970 | Sifford | 251/306 |
| 3,749,359 | 7/1973 | Montesi | 251/306 |

FOREIGN PATENT DOCUMENTS 1550204 10/1966 Fed. Rep. of Germany ............ 251/307
2227983 1/1974 Fed. Rep. of Germany ............ 251/173

*Primary Examiner*—William R. Cline
*Assistant Examiner*—H. Jay Spiegel
*Attorney, Agent, or Firm*—Cushman, Darby & Cushman

[57] ABSTRACT

A butterfly valve assembly having a corrosive resistant metal valve seat made of stainless steel or the like and supported in the passage of the body member of the valve assembly, the valve assembly further having a valve disc with an annular resilient sealing ring fixedly secured to the periphery thereof for cooperating with the valve seat. The valve seat is supported on the body member in such a manner that the valve seat may have limited axial movement relative to the body member when the valve disc is moved to the closed position so as to provide a compressive and/or fluid actuated seal between the valve seat and the body member whereby the butterfly valve assembly may be used in fluid distribution systems with the flow of fluid through the valve assembly being in either direction through the valve.

13 Claims, 6 Drawing Figures

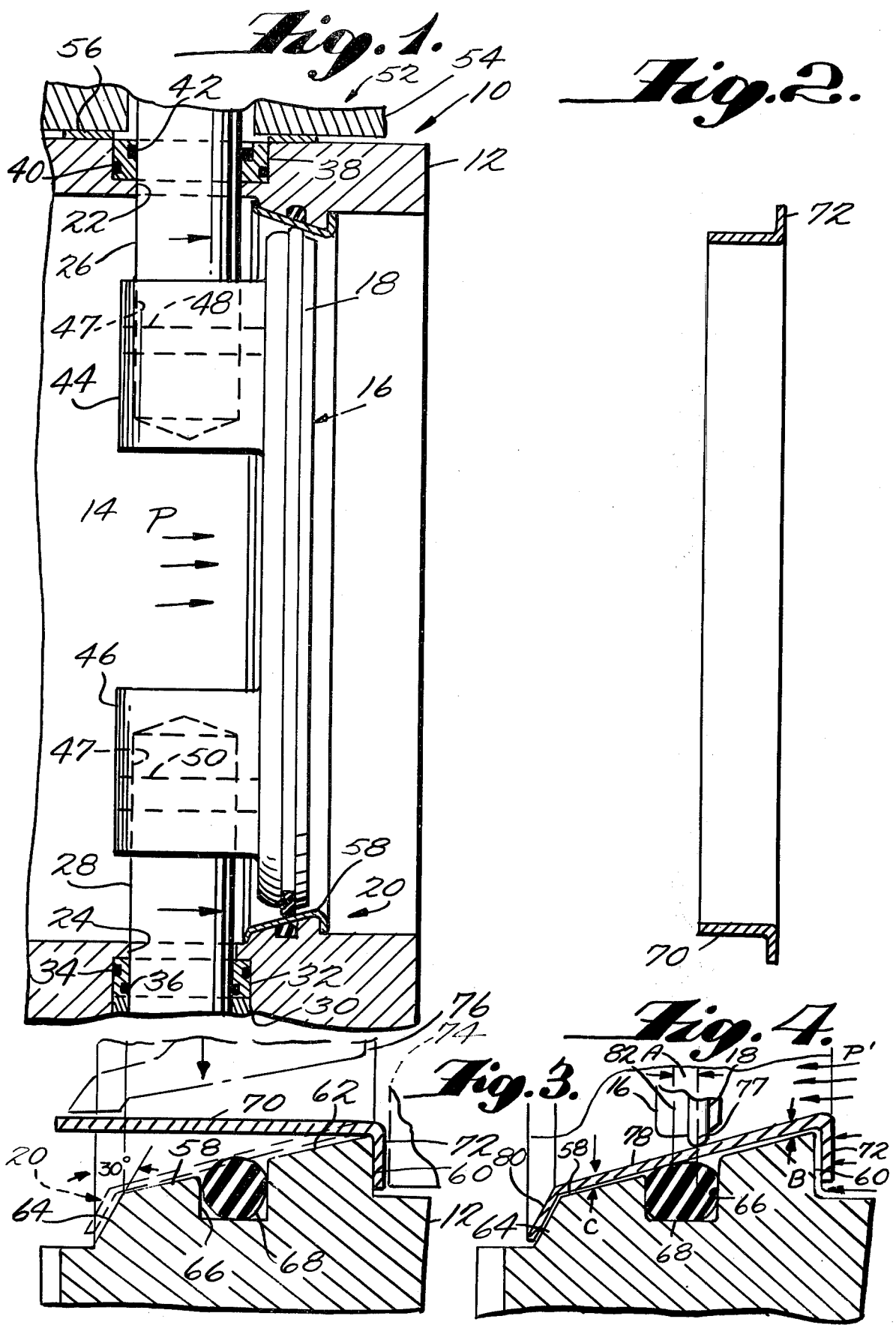

VALVE SEAT CONSTRUCTION FOR BUTTERFLY VALVES

The present invention relates to an improved butterfly valve assembly of the type having a valve disc carried on a shaft and movable between opened and closed positions. More particularly, the present invention relates to an improvement in the valve seat arrangement of a butterfly valve assembly wherein a corrosive resistant metal valve seat is supported in the fluid passage of the body member for a special coaction with the valve disc whereby the butterfly valve assembly is capable of having flow therethrough in either direction.

BACKGROUND OF THE INVENTION

Butterfly valve assemblies have found frequent use in recent years in fluid distribution systems, such as water, chemical and sewage systems, wherein the mains or pipes are of relative large diameters. These valves usually employ a large circular vane or disc usually rotatable or pivotable on a displaced axis in a fluid passage extending through a valve body member. The disc is movable from a closed position where it engages a seat carried in the valve body member to provide a seal against leakage in the fluid main, to an opened position where it is effectively in a somewhat streamlined alignment with the axis of the flow of fluid in passage through the valve body member so as to permit free substantially non-turbulent flow therethrough the valve assembly. In the design of these butterfly valve assemblies, it is a highly desirable design criteria to provide a seat which will be effective for the life of the valve assembly as it is often difficult and expensive to remove and replace the seat in the field. Additionally, it is an important design criteria to provide a seat in a butterfly valve which permits the valve assembly to be installed in a fluid main or pipe regardless of the direction of flow of fluid therethrough.

Heretofore, efforts have been made to design butterfly valve assemblies with a seat construction which would obviate the difficulties encountered from wear but such prior efforts have not been entirely satisfactory because of the expense involved in manufacture and further, because the seats would not accommodate for wearing conditions during the life of the valve and especially would not accommodate for use of the valve with flow in either direction.

In the prior art of seat construction for butterfly valve assemblies, systems have been employed wherein a recess was provided in the passage of the valve body member and a rubber or rubber-like resilient material was molded into the recess for cooperating with the valve disc. This type of construction failed to completely eliminate leakage resulting from tolerance accumulations and slight manufacturing errors and it was unusually difficult to replace the seat in the field without special equipment. Replaceable and adjustable rubber or rubber-like seats were used, but again such seats did not fully reach the desired design criteria.

Accordingly, hard, corrosive resistant metal seats were used and these seats were either machined directly into the valve body member which required the body member to be made from an expensive corrosive resistant material or were machined on inserts supported in the valve body. In some instances these metal seats were mechanically attached by cementing or threading the seat to the valve body member, or by circumferentially cold forging a seat ring onto a body receiving surface or by positioning a seat ring in a recess in one section of a body member and retaining it there by another section of a body member. In each instance the seat when assembled in the body member of the valve assembly had no axial movement in the passageway and thus after prolonged operating periods where there could be wear to the seat itself or wear to the resilient sealing ring on the valve disc, leakage could result because of no accommodation for this wear. This resulted in either replacing the resilient ring on the valve disc or replacing and/or refinishing the seat. Furthermore, such valve assemblies, wherein the seat in the body member had no axial flexibility for small limits of axial movement, were not particularly adapted to accommodate for flow through the valve assembly in either direction.

PRIOR ART

Some prior art arrangements for seat designs of butterfly valve assemblies of the types discussed above are disclosed in the following United States patents:

| NUMBER | NAME | DATE |
|--------|------|------|
| 3,409,269 | FAWKES | Nov. 5, 1968 |
| 3,511,474 | MINER | May 12, 1970 |
| 3,525,499 | GEISELMAN ET AL. | Aug. 25, 1970 |
| 3,749,359 | MONTESI | July 31, 1973 |
| 3,774,880 | CROOKHAM ET AL. | Nov. 27, 1973 |

BRIEF SUMMARY OF THE INVENTION

Briefly stated, the broad aspect of the present invention includes a butterfly valve assembly capable of having fluid flow therethrough in either direction with no adverse effect on sealing when the valve disc is in the closed position. The assembly comprises a body member having a passage therethrough, a valve disc having an annular resilient sealing ring fixedly secured to its periphery, the valve disc being supported in the passage for movement between a first position in which the passage is opened to flow of fluid and a second position in which the passage is closed to the flow of fluid. The body member is provided with a corrosive resistant metal valve seat supported in the fluid passageway of the body member, the valve seat having an annular tapered surface portion arranged to cooperate with the annular resilient sealing ring when the valve disc is in the closed position. Means support the metal valve seat in the body member for the limited axial movement relative to the body member when the disc is moved to the second or closed position, the means providing a compressive and/or fluid actuated seal between the valve seat and the body member whereby the butterfly valve assembly may be utilized with fluid flow therethrough in either direction.

Another aspect of the present invention is to provide a body member of a butterfly valve assembly with a corrosive resistant metal valve seat having an annular tapered surface portion which has a cross-sectional thickness progressively decreasing from its smaller end to its larger end. By having such a metal valve seat which also has limited axial movement relative to the body member, the valve seat can accommodate for wear of the resilient seal about the periphery of the valve disc as the valve seat does have some slight flexibility. This also enhances the utilization of the valve assembly as the valve assembly can accommodate flow of fluid therethrough in either direction and, thus, it does not require installation in a pipeline or main with concern for the direction of flow in that line or main.

Still another aspect of the present invention is the provision of an annular radially inwardly extending projection from the body member of the butterfly valve assembly, the projection being integral with the body member and shaped to receive the corrosive resistant metal valve seat with the annular tapered seating surface. By such an arrangement a cylindrical shaped ring flared at one end can be inserted into the body member and the ring can be cold worked to provide the annular tapered seating surface with its cross-sectional thickness progressively decreasing from the smaller end of the seat to the larger end.

Ancillary to the above, the annular projection in the body member is provided with an annular recess which receives a compressible sealing ring, the sealing ring being tightly compressed against the undersurface of the valve seat when the valve is closed and when the fluid pressure is on the side of the valve disc facing the larger end of the valve seat. The sealing ring beneath the valve seat not only functions to provide a tight seal by compression of the same in the aforementioned condition, but when the fluid pressure is on the side of the valve disc which faces the smaller end of the valve seat, fluid pressure acting between the valve seat and the projection provides a fluid actuated seal by the sealing ring along with the usual compression of the sealing ring.

A further aspect of the present invention is to provide a preformed metal valve seat which can be snapped over an annular projection provided in the body member, the preformed valve seat having an annular tapered seating surface and having arcuately spaced slits at the seat's smaller end defining fingers. The slits function to give flexibility to the fingers whereby the seat can be installed on the annular projection by axially inserting the same through the opening defined by the annular projection.

The annular line of contact between the resilient sealing ring on the periphery of the valve disc and the tapered portion of the valve seat when the valve disc is closed, has a specific relationship to the compressive sealing ring between the valve seat and the projection in the passage of the body member. This annular line of contact is displaced towards the smaller end of the metal valve seat relative to a plane through the median of the annular compressive sealing ring between the undersurface of the valve seat and the projection. Such a relationship, when the valve seat has limited axial movement, increases the activating pressure on both sealing rings when the valve disc is in the closed position as well as permitting fluid pressure to assist in sealing.

The butterfly valve assembly of the present invention also contemplates providing a corrosive resistant metal valve seat which may have limited axial movement relative to the body member, the valve seat being retained on an annular resilient ring and positioned between a shoulder in the passage of the body member and a split retaining ring.

These and other objects and advantages of the invention will appear more fully in the following specification, claims and drawings.

BRIEF DESCRIPTION OF THE DRAWINGS

FIG. 1 is a fragmentary vertical sectional view, partly in elevation of a butterfly valve incorporating the corrosive resistant metal valve seat of the present invention.

FIG. 2 is a sectional view through a cylindrical member having an outwardly flared flange at one end, the member being utilized to form the valve seat of the butterfly valve assembly of FIG. 1.

FIG. 3 is an enlarged fragmentary view illustrating positioning of the cylindrical member through the annular seat retaining projection of the body member of the valve assembly prior to the cylindrical member being cold formed into a seat having limited axial movement with respect to the passage through the body member.

FIG. 4 is a fragmentary sectional view similar to FIG. 1 but illustrating the formed valve seat and the relationship of the sealing ring about the periphery of the valve disc to the sealing ring positioned between the valve seat and the projection in the body member.

DETAILED DESCRIPTION OF THE INVENTION

Figure 5:
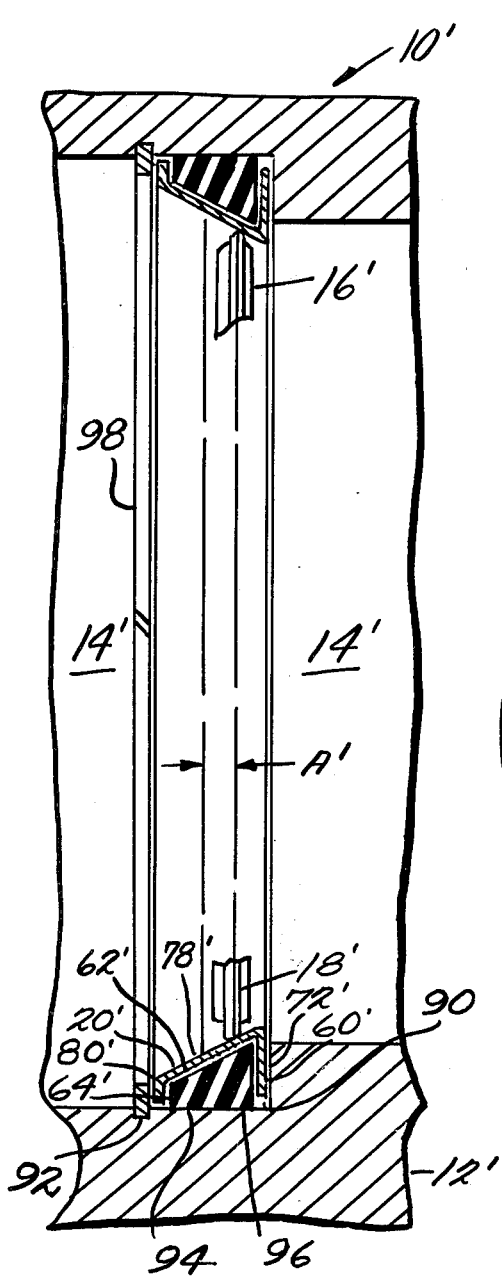
FIG. 5 is a fragmentary vertical sectional view similar to FIG. 1 but illustrating a modified form of valve seat held in position in the passage through the body member between a shoulder in the passage of the valve body member and a split retaining ring provided in an annular recess in the passage.

Referring now to the drawings wherein like characters or reference numerals represent like or similar parts, there is disclosed a butterfly valve assembly generally designated by the numeral 10 in FIG. 1. The butterfly valve assembly 10 includes a body member 12 having a passage 14 therethrough and a butterfly valve disc generally designated at 16, the butterfly valve disc being annular and having a resilient sealing ring 18 extending about its periphery. An annular valve seat 20 is provided in the passage 14 of the body member 12 and as is usual in this type of butterfly valve assembly, the resilient sealing ring 18 of the valve disc 16 is arranged to have annular line contact with the valve seat 20.

In more detail, the body member 12 of the butterfly valve assembly is provided with aligned apertures 22 and 24 for receiving stub shafts 26 and 28 respectively. The lower stub shaft 28 extends through the aperture 24 and may be rotatably supported therein by bushing 30. Sealing means 32 surrounding the shaft 28 seals the interior of the valve body member from the exterior, the sealing means being provided with external an internal O-rings 34 and 36 respectively. The upper stub shaft 26 extends through the aperture 22 and out of the body member 12, there being provided sealing means 38 surrounding the shaft 26, the sealing means 38 also having external and internal O-rings 40 and 42 respectively.

The valve disc 16 is provided with bosses 44 and 46 thereon, each having a closed bottom radially outwardly facing bore 47 for receiving the inner ends of the shafts 26 and 28 respectively. Suitable pins, studs or the like 48 and 50 are utilized to fixedly attach the valve disc 16 to the shafts 26 and 28.

A valve operator mechanism generally designated at 52 has its lower flange 54 attached to the body member 12 and a gasket 56 interposed between the valve operator mechanism and the body member seals around the exterior portion of the shaft 26 extending into the valve operator mechanism. For the purpose of this specification the valve operator mechanism may be of the type disclosed in U.S. Pat. No. 3,877,677 issued April 5, 1975 to Joseph L. Daghe and Richard A. Stultz and assigned to Mueller Co., Decatur, Ill., the same assignee as the present invention. It will be appreciated by those skilled in the art that the valve operator mechanism rotates the shaft 26 to cause the valve disc 16 to pivot about the axis of the shafts 26 and 28 which is parallel to but spaced or displaced from a plane through the valve disc between the closed position shown in FIG. 1 and an opened position (not shown) but usually substantially streamlined to the flow of fluid through the passage 14. Of course, the valve operator mechanism 52 can throttle the valve disc 16 between the closed and the fully opened positions is so desired.

Referring now to FIGS. 2, 3 and 4, the annular valve seat 20 is made of a corrosive resistant metal such as stainless steel or the like and is formed by cold working onto an annular radially inwardly extending projection 58 integrally extending from the body member 12 into the passage 14. In more detail, the projection 58 includes a radially inwardly extending annular face 60 which is machined, a frusto-conical or tapering annular surface portion 62 and a second angular face 64 sloping at an angle in the order of thirty degrees to a radius of the passage 14, the surface portion 62 of the projection 58 tapers outwardly from the face 60 to the face 64 at an angle in the order of fourteen degrees. The annular surface portion 62 of projection 58 is provided with an annular recess 66 in which is positioned an annular resilient sealing ring 68 such as an O-ring or the like.

The corrosive resistant metal valve seat 20 is preformed as a cylindrical ring member 70 as shown in FIG. 2, the member 70 having an outwardly flared flange 72 at one end. The cylindrical ring member and its flange 72 in the preformed condition have a uniform cross-sectional wall thickness. The outside diameter of the cylindrical member 70 is no greater than the diameter of the smaller end of the tapered surface portion 62 of the projection 58 so that the cylindrical member 70 may be slipped axially through the projection 58 until its flared end 72 mates with the radially extending annular machined surface 60 of the annular projection 58 as shown in FIG. 3. When the cylindrical member 70 has been positioned in the opening defined by the annular projection 58 as shown in full lines in FIG. 3, a die member 74, schematically shown in broken lines holds the cylindrical member 70 in position prior to cold working or forming the member on the projection to define the valve seat 20. A suitable forming roller 76, also shown schematically in broken lines, cold forms the cylindrical member 70 to the shape of the annular projection 58, this being shown in FIG. 3 in broken lines. During the cold forming operation the cylindrical member is expanded outwardly onto the tapered surface 62 of the projection 58, thus reducing its cross-sectional wall thickness progressively from the small end to the large end of the seat 20, the remainder of the cylindrical ring member 70 being formed about the angled face 64 to thereby axially retain the valve seat 20 on the projection. During the cold forming of the valve seat 20 on the projection 58, the resilient sealing ring 68, which is previously positioned in the recess 66, is compressed.

After the cylindrical member 70 has been cold formed by expanding it onto the projection 58, there is a certain amount of springback which occurs in the formed valve seat 20 when the die 74 and the forming roller 76 are removed. The amount of springback is governed by the extent to which the material is expanded past its yield point and because of this springback the valve seat 20 has a fit on the projection 58 which is less than tight and thus permits limited axial movement of the valve seat 20 relative to the projection 58 of the body member 12. This limited axial movement of the valve seat 20 on the projection 58 enhances the seal by the sealing ring 18 of the valve disc 16 and enhances the seal between the valve seat and the projection by the sealing ring 68 when the valve disc is in the closed position regardless of which side of the valve disc is subjected to line fluid pressure.

Referring to the fragmentary sectional view of FIG. 4, which shows the valve seat 20 formed on the projection 58, it will be noted that the valve disc 16 is illustrated in the closed position with its sealing ring 18 having line contact 77 with the frusto-conical or tapered surface portion 78 of the valve seat 20. The valve seat 20 has moved towards the right of the figure so that its outwardly flared end 80 abuts the angled face or surface 64 with its other outwardly flared end 72 spaced from the machined face 60. Additionally, it will be noted that the line contact 77 of the sealing ring 18 with the surface 78 is displaced from a median or radial plane 82 through the sealing ring 68 in a direction towards the smaller end of the valve seat 20 by a distance A. When the fluid pressure P is acting on the valve disc in the direction shown in FIG. 1 the compressive pressure of fluid on the valve seat 20, as well as the compressive pressure of the valve disc 16 and its sealing ring 18 on the valve set 20 is increased, thus increasing the compressive load on the sealing ring 68 to provide a very tight seal for the butterfly valve assembly. In the situation where the fluid pressure P' on the valve disc 16 is in the direction shown in FIG. 4 and the valve disc 16 is moved to the closed position, the fluid pressure in this case because of the slight spacing between the flange 72 and the surface 60 can get beneath the valve seat 20 and the projection 58 and thus act directly on the sealing ring 68 to form a tight fluid actuated seal by the sealing ring between the undersurface of the valve seat 20 and the projection 58 in addition to the compressive loads. Additionally, FIG. 4 clearly shows at B and C that the cross-sectional thickness of the wall of the valve seat 20 progressively decreases from the smaller end of the seat to its larger end. By such an arrangement the seat 20 has some flexibility which not only enhances the sealing with the ring 18 of the valve disc 16 upon closing of the valve disc 16, it also accommodates for any wear which might take place on the resilient sealing ring 18 during the life of the valve assembly 10.

Referring to FIG. 5 of the drawings there is disclosed a modified form of the present invention for the butterfly valve assembly 10'. In this form of the invention, the corrosive resistant metal valve seat 20' is preformed with a frusto-conical or tapered portion 78' having axially spaced outwardly extending ends or annular flanges 72' and 80'. The body member 12' has a passage 14' therethrough, the body member 12' being provided with an annular radially inwardly extending shoulder 90 spaced axially from an annular recess 92. The axial extent between the shoulder 90 and the recess 92 is greater than the axial extent between the spaced ends or flanges 72' and 80' of the valve seat 20'. An annular resilient ring 94, which has the combined functions of the projection 58 and the sealing ring 68 of FIG. 1, is provided for support of the valve seat 20', the resilient ring 94 having an outer cylindrical surface 96, an inner tapered or substantially frusto-conical surface portion 62' and end faces 60' and 64'. The axial extent between the faces or ends 60' and 64' may be slightly less than the axial extent between the flanges or ends 72' and 80'.

The resilient ring 94 is preliminarily fitted onto the valve set 20' and the valve seat with the ring are inserted through the passage 14' until the end or flange 72' of the valve seat 20' abuts the shoulder 90. When this is done, the valve seat 20' is axially restrained for limited axial movement by inserting a split retaining ring 98 into the recess or groove 92.

The butterfly valve assembly 10' functions similarly to the butterfly valve assembly 10 in that the valve seat 20' has limited axial movement between the shoulder 90 and the split retaining ring 98. Additionally, the annular line contact between the sealing ring 18' extending about the periphery of the valve disc 16' is displaced a distance A' towards the small end of the valve seat from a median through the annular resilient sealing ring 94.

Figure 6:
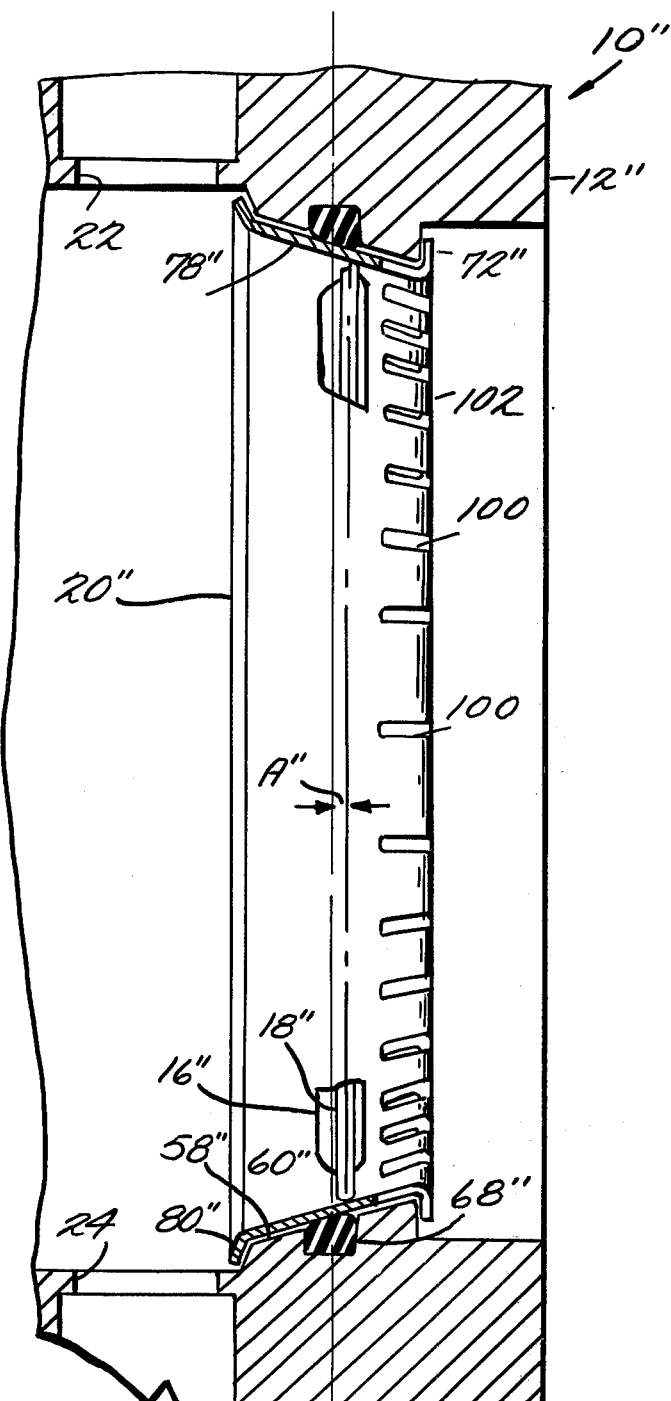
FIG. 6 is a vertical sectional view similar to FIGS. 1 and 5 but disclosing a still further modification of the present invention wherein the metal valve seat may be preformed and snapped into position on an annular projection in the body member of the valve assembly.

Referring now to FIG. 6 a second modification of the present invention is disclosed and in this instance the metal valve seat 20" is also preformed with a frusto-conical or tapered portion 78" having outwardly flared ends or flanges 72" and 80". The annular projection 58" in the body member 12" is substantially identical to the projection 58 of FIG. 1 and is integrally formed in the body member. Since it is necessary to position the valve seat 20" onto the annular projection 58", the smaller end of the valve seat is provided with arcuately spaced slits or slots 100 which define a plurality of spring fingers 102. By such an arrangement the valve seat 20" can be inserted axially in the passage 14" through the large end of the projection 58" with the fingers 102 being deflected inwardly until they snap over the smaller end of the projection 58". Again, the valve seat 20" has limited axial movement on the projection 58" and thus it will function similarly to the valve seat 20 described with respect to FIG. 1. It will be noted that the sealing ring 18" of the valve disc 16" has line contact with the frusto-conical surface portion 60", which is displaced towards the smaller end of the valve seat from a median through the sealing ring 68".

The terminology used in this specification is for the purpose of description and not limitation, the scope of the invention being defined in the claims.

What is claimed is:

1. A butterfly valve assembly capable of having fluid flow therethrough in either direction, said butterfly valve assembly comprising:
    a body member having a passage therethrough for flow of fluid in either direction;
    a valve disc having an annular resilient sealing ring fixedly secured to its periphery, said valve disc being supported in said passage for movement between a first position in which said passage is open to flow of fluid and a second position in which said passage is closed to flow of fluid;
    a corrosive resistant metal valve seat supported in the fluid passage in said body member, said valve seat having an annular tapered surface portion arranged to cooperate with said annular resilient sealing ring when said valve disc is in said second position for closing said passage to flow of fluid and said metal valve seat having a cross-sectional thickness progressively decreasing from its smaller end to its larger end to provide flexibility to the same to enhance sealing with said sealing ring and to compensate for wear of said sealing ring; and,
    means to support said metal valve seat in said body member for limited axial movement relative to said body member when said disc member is moved to said second position and to provide a compressive seal between said valve seat and said body member when fluid flow is in a direction from the larger end toward the smaller end of said valve seat and to provide a fluid actuated seal between said valve seat and said body member when fluid flow is in an opposite direction from the smaller end to the larger end of said valve seat.

2. A butterfly valve assembly as claimed in claim 1 in which said metal valve seat has its smaller end and its larger end each flared outwardly from said annular tapered surface portion's axial extent.

3. A butterfly valve assembly as claimed in claim 1 in which said metal valve seat has its smaller end and its larger end flared outwardly from said annular tapered surface portion's axial extent and in which said means to support said metal valve seat in said body member for limited axial movement includes an annular radially inwardly extending projection from said body member, said projection having an axial extent less than the axial extent between the flared ends of said metal valve seat which is sufficient to permit limited axial movement of the metal valve seat relative to the body member.

4. A butterfly valve assembly as claimed in claim 3 in which said annular radially inwardly extending projection is an annular resilient ring having an axial extent less than the axial extent between the flared ends of said metal valve seat and including a shoulder in said passage spaced from an annular recess in said passage, and a split retaining ring in said recess for retaining said valve seat and said projection for limited axial movement between the split ring and the shoulder.

5. A butterfly valve assembly as claimed in claim 3 in which said annular projection has an annular recess and in which said means to provide a compressive and/or fluid actuated seal between said valve seat and said body member is a compressible sealing ring positioned in said recess and underlying said valve seat.

6. A butterfly valve assembly as claimed in claim 5 in which said metal valve seat is preformed and is provided on its smaller end with a plurality of arcuately spaced slits whereby the metal valve seat may be installed by axially inserting the same through the opening defined by the annular projection.

7. A butterfly valve assembly as claimed in claim 5 in which said resilient sealing ring on the periphery of said valve disc has an annular line of contact with said metal valve seat which is axially displaced towards the smaller end of said metal valve seat relative to a plane through the median of said annular compressive sealing ring in said recess of the projection from said body member.

8. A butterfly valve assembly as claimed in claim 5 in which said annular projection is integral with said body member.

9. A butterfly valve assembly as claimed in claim 8 in which said corrosive resistant metal valve seat is formed from a cylindrical member having an outwardly flared flange at one end, the annular cylindrical member being cold worked on said projection to provide said tapered portion and a flange at the other end.

10. A butterfly valve assembly capable of having fluid flow therethrough in either direction, said butterfly valve assembly comprising:
- a body member having a passage therethrough for flow of fluid in either direction, said body member having an annular radially inwardly extending projection with a substantially frusto-conical surface portion and separated by axially spaced end portions, an annular recess in said projection intermediate the end portions and in the frusto-conical surface portion;
- an annular resilient sealing ring in said recess;
- a metal valve seat supported on said projection and having a cross-sectional configuration substantially complementary to the cross-sectional configuration of said projection, said metal valve seat having a substantially frusto-conical seating surface portion and outwardly flaring axially spaced flanges, said flanges being spaced apart an axial distance greater than the axial distance between the end portions of said projection whereby said valve seat has limited axial movement relative to said body member, said metal valve seat having a cross-sectional thickness progressively decreasing from its smaller end to its larger end to provide flexibility in the same when supported on said projection; and,
- a valve disc having an annular resilient sealing ring fixedly secured to its periphery, said valve disc being supported in said passage for movement between a first position in which said passage is open to flow of fluid and a second position in which said passage is closed to flow of fluid by annular line contact between said annular resilient sealing ring of said disc and the frusto-conical surface of said metal valve seat, said annular resilient sealing ring in said recess providing a compressive seal between said valve seat and said body member when said valve disc is in said second position and when fluid flow is in a direction from the larger end toward the smaller end of said valve seat and to provide a fluid actuated seal between said valve seat and said body member when fluid flow is in an opposite direction from the smaller end to the larger end of said valve seat.

11. A butterfly valve assembly as claimed in claim 10 wherein said resilient sealing ring on the periphery of said valve disc has the annular line of contact with said frusto-conical surface of said metal valve seat which is axially displaced from a plane through said annular resilient sealing ring in said recess towards the smaller end of said metal valve seat.

12. A butterfly valve assembly as claimed in claim 11 in which said metal valve seat is preformed and has sufficient resiliency to permit insertion through an opening defined by said projection from the large end of said projection towards and through the small end.

13. A butterfly valve assembly as claimed in claim 12 in which said metal valve seat is provided with arcuately spaced slits in its smaller end extending through the end flange and partly into the frusto-conical portion of the valve seat.